United States Patent
Moore et al.

(10) Patent No.: US 6,658,438 B1
(45) Date of Patent: Dec. 2, 2003

(54) METHOD FOR DELETING STORED DIGITAL DATA FROM WRITE-ONCE MEMORY DEVICE

(75) Inventors: Christopher S. Moore, San Jose, CA (US); Derek J. Bosch, Mountain View, CA (US); Daniel C. Steere, Menlo Park, CA (US); J. James Tringali, Los Altos, CA (US)

(73) Assignee: Matrix Semiconductor, INC., Santa Clara, CA (US)

(*) Notice: Subject to any disclaimer, the term of this patent is extended or adjusted under 35 U.S.C. 154(b) by 215 days.

(21) Appl. No.: 09/638,439

(22) Filed: Aug. 14, 2000

(51) Int. Cl.[7] .............................................. G06F 17/30
(52) U.S. Cl. ........................ 707/205; 707/200; 707/206
(58) Field of Search ................................ 707/200–206; 711/100–103

(56) References Cited

U.S. PATENT DOCUMENTS

| | | | |
|---|---|---|---|
| 4,272,880 A | | 6/1981 | Pashley |
| 4,442,507 A | | 4/1984 | Roesner |
| 4,489,478 A | | 12/1984 | Sakurai |
| 4,498,226 A | | 2/1985 | Inoue et al. |
| 4,499,557 A | | 2/1985 | Holmberg et al. |
| 4,646,266 A | | 2/1987 | Ovshinsky et al. |
| 4,677,742 A | | 7/1987 | Johnson |
| 4,691,299 A | * | 9/1987 | Rivest et al. ........... 365/189.01 |
| 4,868,804 A | * | 9/1989 | Le Carvennec et al. . 369/44.34 |
| 5,029,125 A | * | 7/1991 | Sciupac ..................... 707/205 |
| 5,065,389 A | | 11/1991 | Roth |
| 5,070,384 A | | 12/1991 | McCollum et al. |
| 5,241,659 A | * | 8/1993 | Parulski et al. ............. 345/589 |
| 5,306,935 A | | 4/1994 | Esquivel et al. |
| 5,315,178 A | * | 5/1994 | Snider ......................... 326/39 |

(List continued on next page.)

FOREIGN PATENT DOCUMENTS

WO      WO 99/14763        3/1999

OTHER PUBLICATIONS

Zhang, Ph.D., Guobiao, "3D–ROM—A First Practical Step Towards 3D–IC –Semiconductor International", Jul. 2000, pp. 1–7.*
The Norton Desktop (Version 3 for Windows), User's Guide, 1993, pp. 16–1–16–6.*
*The Norton Desktop* (Version 3 For Windows) User's Guide, pp. 16–1–16–6 (1993).
Douglas, John H., "*The Route To 3–D Chips*", High Technology, Sep. 1983, vol. 3, No. 9, pp. 55–59.
Edited by Cappelletti, Paulo et al., "*Flash Memories*", Kluwer Academic Publishers, 1999 p. 47, p. 308.
Kawashima, Shoichiro et al., "*A Charge–Transfer Amplifier and an Encoded–Bus Architecture for Low–Power SRAM's*", IEE Journal of Solid–State Circuits, vol. 33, No. 5, May 1998, pp. 793–799.
Zhang, Ph.D., Guobiao, "*Three–Dimensional Read–Only Memory (3D–ROM)*", presentation from website zhangpatents, pp. 1–29.
Zhang, Ph.D., Guobiao, "*3D–ROM—A First Practical Step Towards 3D–IC*" Semiconductor International, Jul. 2000, from website zhangpatents, pp. 1–7.

*Primary Examiner*—Greta Robinson
*Assistant Examiner*—Linh Black
(74) *Attorney, Agent, or Firm*—Brinks Hofer Gilson & Lione

(57) ABSTRACT

A digital storage system is coupled to a write-once memory array. File delete commands are implemented by overwriting a destructive digital pattern to at least a portion of the memory cells associated with the file to be deleted. One disclosed system alters the manner in which a file delete command is implemented, depending upon whether the file is stored in a write-once memory or in a re-writable memory.

14 Claims, 5 Drawing Sheets

U.S. PATENT DOCUMENTS

| | | |
|---|---|---|
| 5,427,979 A | 6/1995 | Chang |
| 5,441,907 A | 8/1995 | Sung et al. |
| 5,448,372 A * | 9/1995 | Axman et al. ............... 348/96 |
| 5,535,156 A | 7/1996 | Levy et al. |
| 5,563,947 A | 10/1996 | Kikinis |
| 5,596,639 A | 1/1997 | Kikinis |
| 5,602,987 A | 2/1997 | Harari et al. |
| 5,640,343 A | 6/1997 | Gallagher et al. |
| 5,745,407 A | 4/1998 | Levy et al. |
| 5,835,396 A | 11/1998 | Zhang |
| 6,034,882 A | 3/2000 | Johnson et al. |
| 6,104,638 A * | 8/2000 | Larner et al. .......... 365/185.33 |
| 6,321,360 B1 | 11/2001 | Takeuchi et al. |
| 6,377,526 B1 | 4/2002 | Vining et al. |

\* cited by examiner

| 00000000 | 00000000 | 00000000 |

| 0001000 | 00000111 | 0001001 |

| 11111111 | 11111111 | 11111111 |

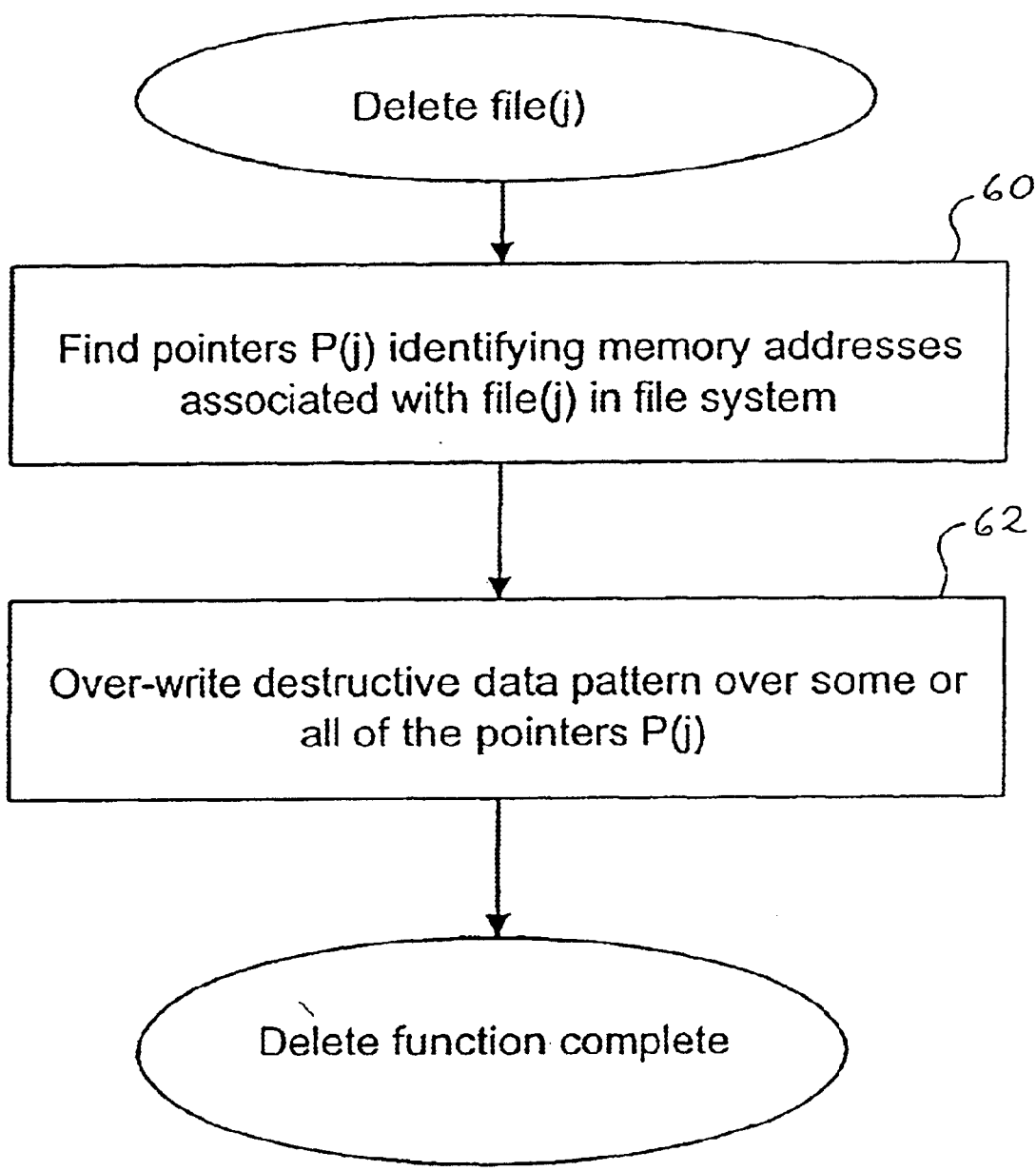

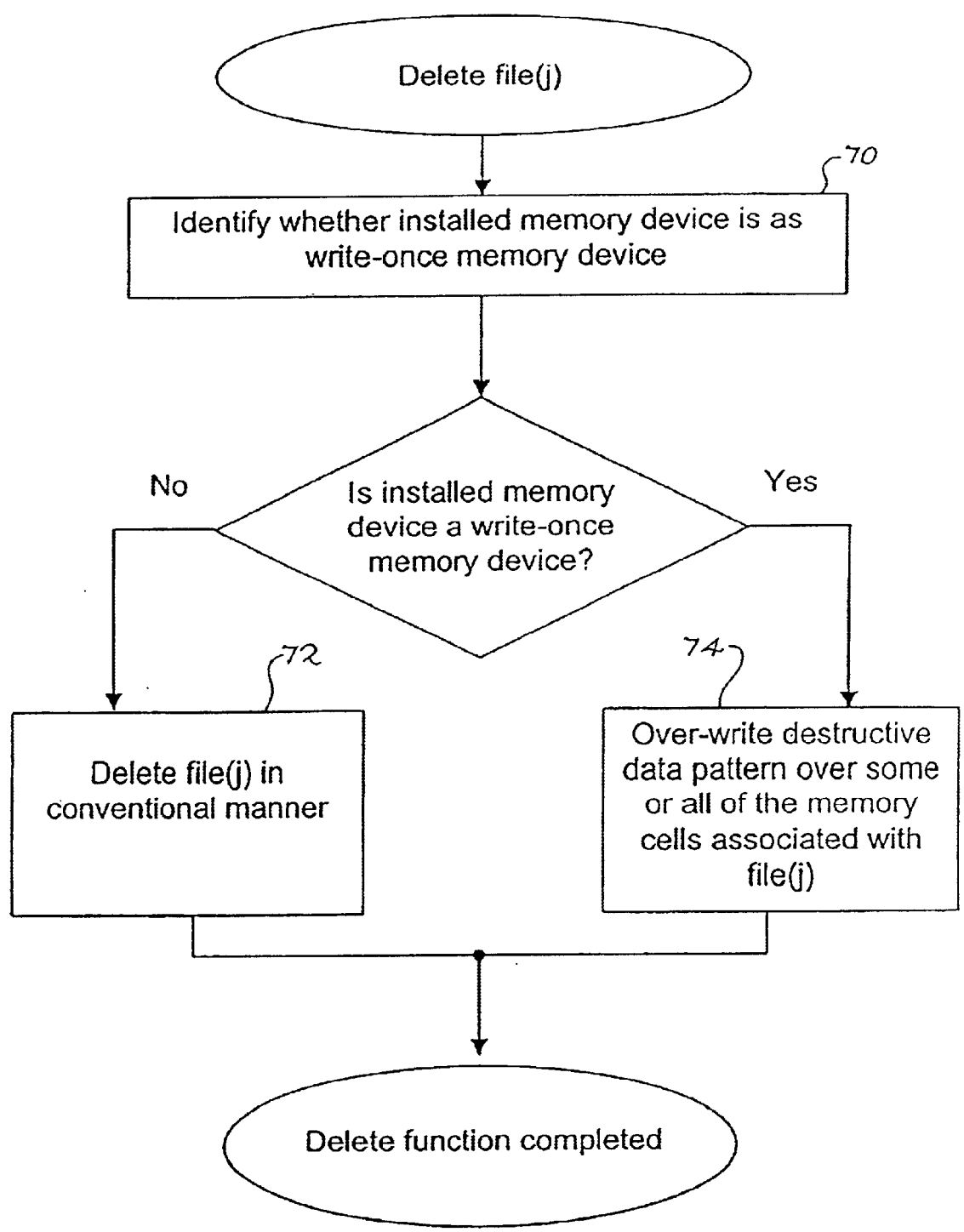

METHOD FOR DELETING STORED DIGITAL DATA FROM WRITE-ONCE MEMORY DEVICE

BACKGROUND

The present invention relates to write-once memory devices, and in particular to methods for deleting stored digital data from such devices.

Non-volatile memory is becoming standard in many products such as digital cameras and digital audio players, and write-once memory devices offer the advantage of low manufacturing costs. Upcoming copy protection standards such as the Secure Digital Media Interface require memory contents to be erased. However, erasing digital files is not possible with write-once memories, since a write-once memory by definition cannot be restored to its original, unwritten state once a file has been written into the memory.

BRIEF SUMMARY

The preferred embodiments described below operate with a write-once memory that includes a plurality of memory cells. The memory stores a digital file, and for this reason some of the memory cells are in an original, unprogrammed digital state, while others of the memory cells are in a programmed digital state. In response to a received delete command associated with the stored digital file, the embodiments described below over-write at least a portion of the stored digital file with a destructive pattern. This destructive pattern switches at least some of the memory cells associated with the digital file from the original, unprogrammed state to the programmed state. For example, some or all of the memory cells associated with the stored file can be over-written with the destructive pattern (111111).

This section has been provided by way of general introduction, and it is not intended to limit the scope of the following claims.

BRIEF DESCRIPTION OF THE DRAWINGS

FIG. 5 is a flow chart of an alternative method implemented by the system of FIG. 1.

FIG. 6 is a flow chart of another method implemented by the system of FIG. 1.

DETAILED DESCRIPTION OF THE PRESENTLY PREFERRED EMBODIMENTS

Figure 1:
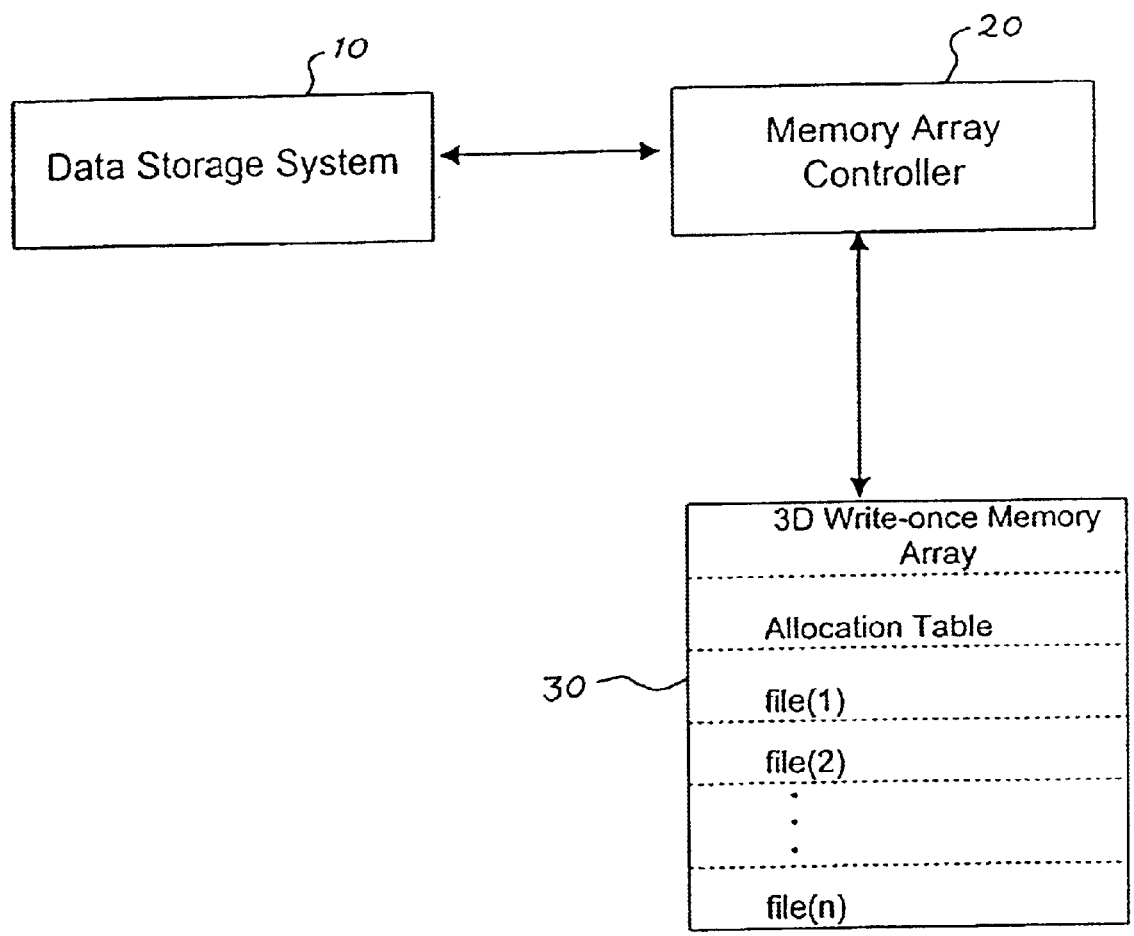
FIG. 1 is a block diagram of a data storage system and memory device that implement a preferred embodiment of this invention.

Turning now to the drawings, FIG. 1 show a data storage system 10 coupled with a memory device comprising a memory array controller 20 and a 3-D write-once memory array 30.

The data storage system 10 can take any suitable form, and may for example be implemented as a digital camera, a digital audio player, a personal digital assistant, a game player, a cellular telephone, an electronic book, or a general purpose programmable computer. The memory array controller 20 and the 3-D write-once memory array 30 can be implemented as any suitable memory device. See for example the 3-D write-once memory devices shown in Johnson U.S. Pat. 6,034,882, Knall U.S. patent application Ser. No. 09/560,626, and Johnson U.S. patent application Ser. No. 09/638,428, all three assigned to the assignee of the present invention and hereby incorporated by reference. Further details regarding alternative structures for the memory device are presented in U.S. patent applications Ser. Nos. 09/638,427 (now U.S. Pat. No. 6,424,581) and 09/638,334, both filed on the same day as the present application, assigned to the assignee of the present application, and hereby incorporated by reference in their entirety.

As explained in the Knall and Johnson patent documents in detail, 3-D write-once memory arrays provide important economies in terms of reduced size of the memory array and associated reductions in manufacturing cost. In particular, a write-once memory array can be fabricated from memory cells, each having only two associated conductors: a wordline and a bitline. Such memory cells can be fabricated at a density of $3 \times 10^7$ memory cells per square millimeter of substrate.

In particular, the cost advantages of the present invention are important in consumer products such as digital cameras, digital audio players and electronic books. In these applications, the write-once memory array 30 is preferably field programmable, and the data storage system 10 field programs the memory array 30 with a desired digital medium, such as a file of one or a sequence of images, a text file such as that suitable for an electronic book, or a digital audio file.

In spite of its many advantages, a write-once memory array provides the disadvantage that it can only be written once. That is, the memory cells of the write-once memory array are fabricated in an initial, unprogrammed digital state, and selected memory cells can then be switched to an alternative, programmed digital state. In one example, the original, unprogrammed digital state can be identified as the Logic 0 state and the programmed digital state can be identified as the Logic 1 state (though the reverse is also possible). Because a memory cell cannot be erased once it is written, it is not possible to erase the files from a write-once memory array by restoring the associated memory cells to the Logic 0 state.

As shown in FIG. 1, the 3-D write-once memory array 30 includes an allocation table and a plurality of files, file(1) through file(n). The allocation table includes pointers identifying the physical addresses of memory cells associated with each of the files. The files may be arranged in either contiguous memory cell locations or a plurality of contiguous blocks of memory cells, where consecutive blocks are not necessary contiguous. For this reason, the allocation table can include one or more pointers for each stored file.

Figure 2:
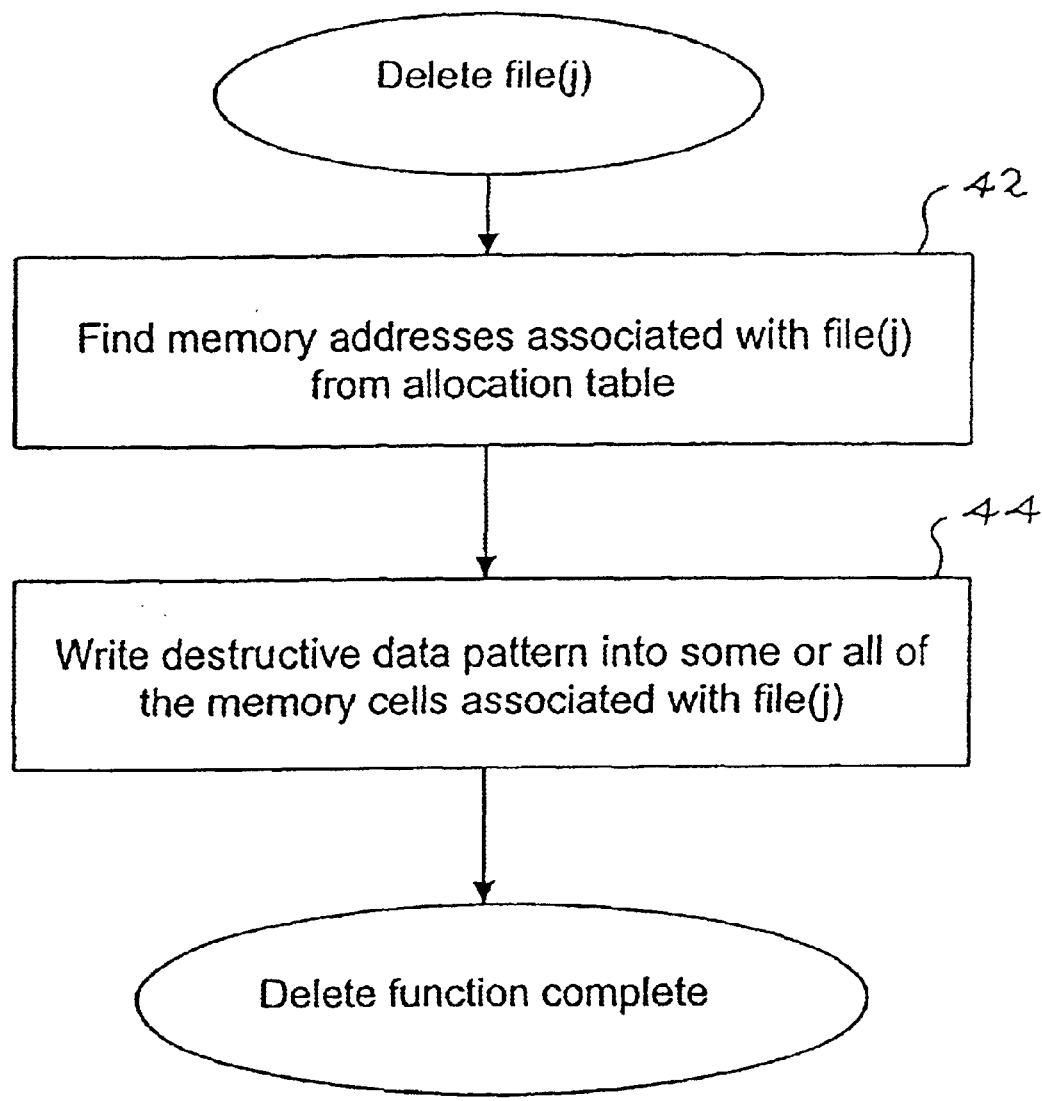
FIG. 2 is a flow chart of a method implemented by the system of FIG. 1.

FIG. 2 is a flow chart of a method implemented by the data storage system 10 and memory array controller 20 of FIG. 1 in response to a delete command. In this example, the delete command relates to file(j). As used herein, the term "delete command" refers broadly to a command that has the effect of making a file difficult or impossible to read, regardless of how the delete command is implemented, e.g. by the various write operations described below.

As shown in block 42 of FIG. 2, first the controller 20 finds the memory addresses in the memory array 30 that are associated with files(j). This is done by consulting the allocation table of the memory array 30. Next, at block 44 the controller 20 writes a destructive data pattern into some or all of the memory cells associated with file(j). This completes the delete function.

Figures 3A, 3B, 3C, 4:
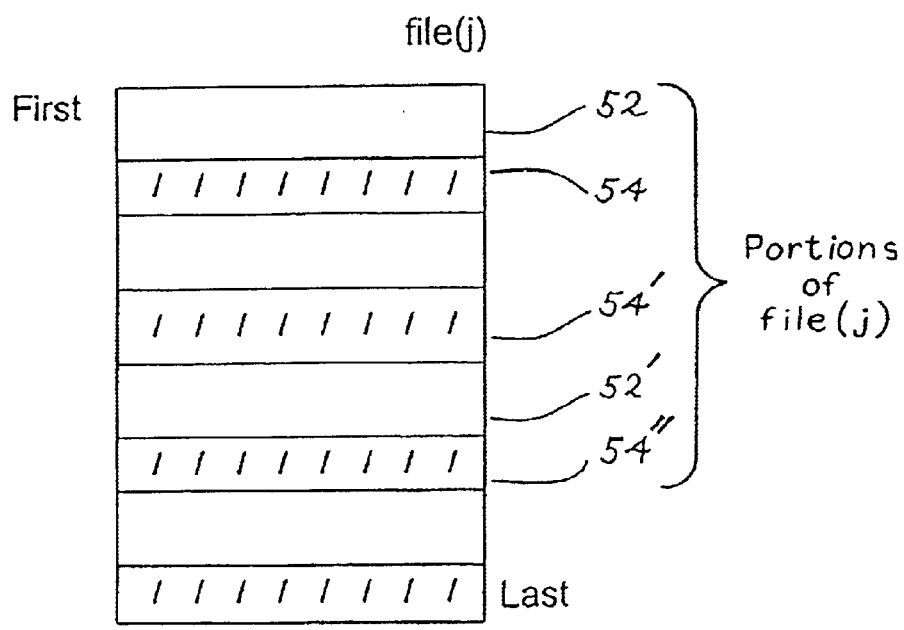
FIGS. 3a, 3b and 3c are schematic diagrams of a plurality of memory cells prior to storage of a digital file, subsequent to storage of a digital file, and subsequent to being over-written with a destructive pattern, respectively.
FIG. 4 is a schematic diagram of a plurality of memory cells associated with a stored digital file, showing selected blocks of memory cells over-written with a destructive digital pattern.

FIGS. 3a through 3c provide a specific example of memory cell states that can result from the method of FIG. 2. FIG. 3a shows selected memory cells of the write-once memory array 30 as initially fabricated, in which the memory cells are all in the Logic 0 state. FIG. 3b shows these memory cells after they have been used to store a portion of file(j). Note that selected memory cells have been written from the Logic 0 state to the Logic 1 state. FIG. 3c shows these same memory cells after the destructive data pattern of block 44 has been written. Note that in this case the destructive data pattern is (11111111), and thus all of the memory cells associated with file(j) have been written to the Logic 1 state. This completely obliterates file(j).

It is not essential in all embodiments that all of the memory cells associated with file(j) be over-written with the destructive data pattern. As shown in the example of FIG. 4, file(j) can include a block of memory cells arranged from a first memory cell at the upper left corner of the drawing to a last memory cell at the lower right corner of the drawing. In FIG. 4, selected portions of file(j) indicated by the reference numerals 54, 54', and 54" have been over-written with the destructive data pattern, while portions of file(j) indicated by the reference numerals 52 and 52' have not been over-written. This approach is well-suited for effectively rendering stored music files unreadable by obliterating intermittent portions of the memory file.

Of course, many alternative data destruction patterns can be used, as long as they achieve the desired result of obliterating the selected portion or portions of the data file to be deleted. For example, the data sequence (01010101) can be used for the pattern, as can (00001111). Also, the pattern may be aperiodic.

Furthermore, it may be preferable in some applications to obliterate the portion of the allocation table associated with a file to be deleted rather than the data of the file itself. Such an alternative embodiment is illustrated in FIG. 5. As shown at block 60, first the pointers P(j) identifying memory addresses associated with file(j) are found in the file system. Then a destructive data pattern is written over some or all of the pointers P(j) in block 62. Once the pointers P(j) have been obliterated, the associated file(j) is not readily retrieved.

The simplest implementation of the functions described above is to use software, due to the shorter time needed to implement, debug and upgrade a software system. However, hardware implementations are also possible. In this case, the controller 20 of FIG. 1 includes logic that accepts a delete command and then searches the memory array 30 for the memory locations to be over-written. The hardware implementation can implement any of the algorithms described above as logic on an integrated circuit.

As another alternative, the over-write function described above can be performed in a manner that reduces the time required for the over-write operation. For example, the controller 20 can simultaneously over-write memory cells in multiple layers that share a given row and column address, thereby over-writing the memory cells in a plurality of layers of a 3-D memory array at one time rather than selecting them individually. Similarly, the controller can over-write a complete page, block or other set of memory cells simultaneously to increase the speed of the over-write operation.

In some applications it may be desirable to over-write only a small portion of memory cells associated with a particular file. For example, with the Secure Digital Media Interface used by the recording industry to control copying of digital music, one may wish to eliminate a section of the file that shows how many time a user has listened to or made copies of the data. This allows a user to reset the data without rewriting the entire data file.

One advantage of the embodiments described above is that the end user can simply use the data storage system in the conventional manner, commanding that files be deleted. Either the data storage system or the memory array controller automatically implements this delete command by over-writing as described above.

In many applications the data storage system 10 may be useable both with write-once memory arrays as described above as well as with re-writable memory arrays. For example, the memory device may be a modular, portable device that is readily connected to and disconnected from the data storage system. In this case, the method of FIG. 6 has particular advantages. According to this method, first the data storage system identifies whether the installed memory device is a write-once memory device or not. This can be done by automatically sensing an electronic, mechanical, mechanic, or optical feature of the memory device. In a preferred embodiment, the memory device responds to a read command by providing an identification code identifying the memory device as a write-once memory device. Further details of implementation are described in U.S. patent application Ser. No. 09/638,427 (now U.S. Pat. No. 6,424,581), filed on the same day as the present application, which is hereby incorporated by reference.

Control is then transferred either to block 72 or block 74, depending upon whether the installed memory device is a write-once memory device or not. If so, a destructive data pattern is written in block 74 over some or all the memory cells associated with the file to be deleted. Any of the techniques described above can be used. In this connection, the term "memory cells associated" with a particular file is intended broadly to include both the memory cells of the allocation table that identify the physical addresses of the memory cells storing the data of the associated file, as well as these data-storing cells themselves.

In the event the installed memory device is not a write-once memory device, the file to be deleted is deleted in the conventional manner in block 72. This is often done by clearing the pointers of the file allocation table (for example, by resetting the pointers to the Logic 0 state described above).

An advantage of this method is that the implementation of a file delete command is automatically optimized for the particular type of memory device that is currently installed. As explained above, write-once memory devices differ substantially from re-writable memory devices, and for this reason the same delete techniques are not optimal from both types of memory devices. This optimization is provided in this embodiment in a manner that is completely invisible to the end user, and thus all the advantages described above are obtained without complicating the commands used by the end user to delete files.

As used herein, the term "stored digital file" is intended broadly to encompass addressing pointers such as those of the allocation table described above, as well as the digital data itself.

"Programmed digital state" is intended broadly to encompass one or more states. For example, a programmed digital state can equal the Logic 1 state in a binary storage system, or the Logic 1 or the Logic 2 state in a three-state digital system.

The term "simultaneously" is intended broadly to encompass operations that overlap in time, whether or not they start and stop at precisely the same instant.

The term "block" as applied to memory cells refers to a contiguous set of memory cells, including a memory page for example.

The forgoing detailed description has described only a few of the many possible implementations of the present invention. For this reason, this detailed description is intended by way of illustration, and not by way of limitation. It is only the following claims, including all equivalents, that are intended to define the scope of this invention.

What is claimed is:

1. A method for deleting stored digital data from a write-once memory device, said method comprising:
    (a) providing a write-once memory array comprising a plurality of memory cells, wherein some of the cells are in an original digital state and others of the cells are in a programmed digital state, and wherein the states of the memory cells represent a stored digital file;
    (b) receiving a delete command associated with the file; and then
    (c) over-writing at least a portion of the stored digital file with a destructive pattern, said pattern switching at least some of the memory cells associated with the digital file to the programmed digital state;
        wherein the write-once memory array comprises a three-dimensional memory array, wherein the memory cells are arrayed in rows, columns, and layers in the three-dimensional memory array, and wherein (c) comprises over-writing a plurality of memory cells in different layers substantially simultaneously.

2. A method for deleting stored digital data from an installed memory device, said method comprising;
    (a) identifying the installed memory device as one of a write-once memory device and a re-writable memory device;
    (b) receiving a delete command associated with a digital file stored in the installed memory device;
    (c) when the installed memory device is a write-once memory device, over-writing at least a portion of the stored digital file with a destructive pattern, said pattern switching at least some memory cells associated with the digital file to a programmed digital state, and
    (d) when the installed memory device is a re-writable memory device, implementing the delete command differently than in (c).

3. The method of claim 2 wherein the stored digital file comprises addressing information that identifies memory cell addresses associated with the stored digital file; and wherein the at least a portion of the stored digital file that is over-written in (c) consists essentially of the addressing information.

4. The method of claim 2 wherein the at least a portion of the stored digital file that is over-written in (c) consists essentially of the entire stored digital file.

5. The method of claim 2 wherein (c) comprises over-writing a plurality of memory cells associated with the stored digital file substantially simultaneously.

6. The method of claim 2 wherein said pattern switches substantially all of the over-written memory cells associated with the digital file to the programmed digital state.

7. The method of claim 2 wherein the at least a portion of the stored digital file that is over-written in (c) comprises multiple spaced blocks of the memory cells associated with the stored digital file.

8. The method of claim 2 wherein the delete command is implemented in (d) by clearing at least a portion of the stored digital file.

9. A method for deleting stored digital data from a write-once memory device, said method comprising:
    (a) providing a write-once memory array comprising a plurality of memory cells, wherein some of the cells are in an original digital state and others of the cells are in a programmed digital state, and wherein the states of the memory cells represent a stored digital file;
    (b) receiving a delete comnmand associated with the file; and then
    (c) over-writing at least a portion of the stored digital file with a destructive pattern, said pattern switching at least some of the memory cells associated with the digital file to the programmed digital state;
        wherein the stored digital file comprises addressing information that identifies memory cell addresses associated with the stored digital file; and wherein the at least a portion of the stored digital file that is over-written in (c) consists essentially of the addressing information.

10. A method for deleting stored digital data from a write-once memory device, said method comprising:
    (a) providing a write-once memory array comprising a plurality of memory cells, wherein some of the cells are in an original digital state and others of the cells are in a programmed digital state, and wherein the states of the memory cells represent a stored digital file;
    (b) receiving a delete command associated with the file; and then
    (c) over-writing at least a portion of the stored digital file with a destructive pattern, said pattern switching at least some of the memory cells associated with the digital file to the programmed digital state;
        wherein the at least a portion of the stored digital file that is over-written in (c) consists essentially of the entire stored digital file.

11. A method for deleting stored digital data from a write-once memory device, said method comprising:
    (a) providing a write-once memory array comprising a plurality of memory cells, wherein some of the cells are in an original digital state and others of the cells are in a programmed digital state, and wherein the states of the memory cells represent a stored digital file;
    (b) receiving a delete command associated with the file; and then
    (c) over-writing at least a portion of the stored digital file with a destructive pattern, said pattern switching at least some of the memory cells associated with the digital file to the programmed digital state;
        wherein (c) comprises over-writing a plurality of memory cells associated with the stored digital file substantially simultaneously.

12. A method for deleting stored digital data from a write-once memory device, said method comprising:
    (a) providing a write-once memory array comprising a plurality of memory cells, wherein some of the cells are in an original digital state and others of the cells are in a programmed digital state, and wherein the states of the memory cells represent a stored digital file;

(b) receiving a delete command associated with the file; and then (c) over-writing at least a portion of the stored digital file with a destructive pattern, said pattern switching at least some of the memory cells associated with the digital file to the programmed digital state;

wherein said pattern switches substantially all of the over-written memory cells associated with the digital file to the programmed digital state.

13. A method for deleting stored digital data from a write-once memory device, said method comprising:

(a) providing a write-once memory array comprising a plurality of memory cells, wherein some of the cells are in an original digital state and others of the cells are in a programmed digital state, and wherein the states of the memory cells represent a stored digital file;

(b) receiving a delete command associated with the file; and then (c) over-writing at least a portion of the stored digital file with a destructive pattern, said pattern switching at least some of the memory cells associated with the digital file to the programmed digital state;

wherein the at least a portion of the stored digital file that is over-written in (c) comprises multiple spaced blocks of the memory cells associated with the stored digital file.

14. The method of claim 1 wherein the plurality of memory cells in different layers that are over-written substantially simultaneously share a given row and column address.

* * * * *